April 23, 1957 — E. J. WELLAUER — 2,789,480
FABRICATED STRUCTURE
Filed March 18, 1952
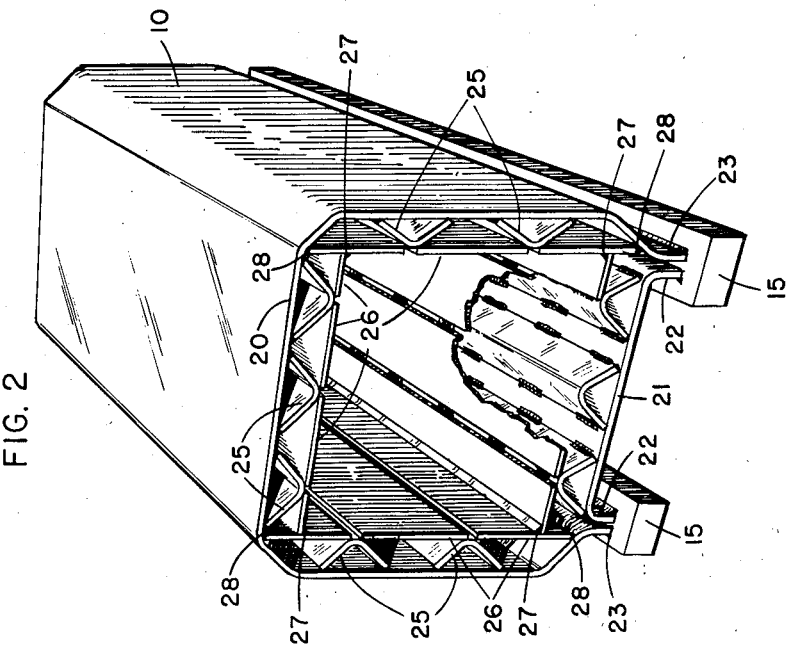
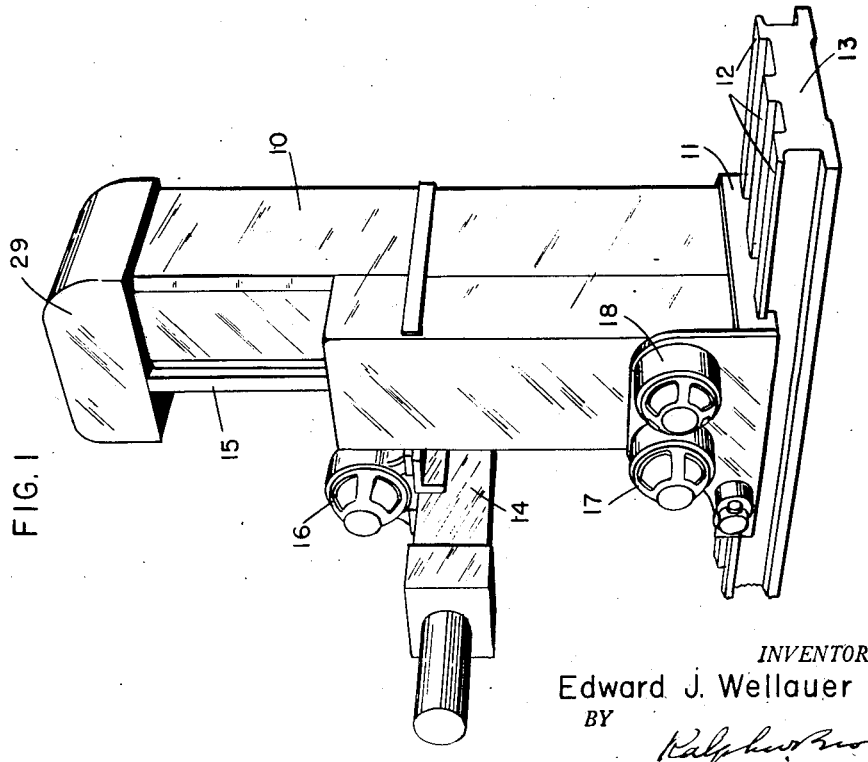
INVENTOR.
Edward J. Wellauer
BY
ATTORNEY

United States Patent Office 2,789,480
Patented Apr. 23, 1957

2,789,480
FABRICATED STRUCTURE

Edward J. Wellauer, Wauwatosa, Wis., assignor to The Falk Corporation, Milwaukee, Wis., a corporation of Wisconsin Application March 18, 1952, Serial No. 277,329

3 Claims. (Cl. 90—11)

This invention relates to fabricated structures for use primarily in machine tools, although capable of advantageous use in other kinds of mechanical equipment wherein great strength and stiffness with minimum weight are important requirements.

Some forms of machine tools involve one or more vertical columns for supporting the work, the tool and/or other operating parts. As heretofore constructed such columns are in the form of castings and, as such, are necessarily heavy in order to provide the requisite strength and stiffness; but the weight thereof has proven to be a rather serious handicap particularly in those machines in which the column is mounted for adjustment or for travel along horizontal ways.

An object of the present invention is to materially reduce the weight of columns for the purposes indicated without impairing the requisite strength and stiffness thereof.

Another object is to provide a fabricated structure wherein the several parts are arranged and joined in a novel manner to provide maximum strength and stiffness with minimum weight.

Other more specific objects and advantages will appear, expressed or implied from the following description of an illustrative embodiment of the invention.

In the accompanying drawings:

Figure 1 is a view in perspective of a machine tool having a vertical column constructed in accordance with the present invention.

Figure 2 is a fragmentary view in perspective of the column shown in Figure 1.

For purposes of explanation the invention is shown embodied in the column 10 of a machine tool of a well known type designed to perform boring, drilling and milling operations. The column 10 is shown rigidly mounted on a supporting base 11 guided for horizontal travel along suitable ways 12 formed on a longitudinally extended bed 13. A head stock 14, guided on vertical ways 15 on the face of the column, carries a pair of horizontal tool spindles (not shown) separately driven and fed through appropriate gearing from a motor 16 mounted on the head stock. Horizontal movements of the column 10 along the bed 13 and vertical movements of the head stock 14 along the column are effected by suitable mechanisms contained in the column and driven by separate motors 17 and 18 carried by the base 11 of the column. Since the present invention is not concerned with the tool spindles, the head stock, or the driving mechanisms therefor or for the column, a further description thereof is deemed unnecessary.

In this instance, however, the column 10 is specifically constructed to materially reduce the weight thereof while maintaining therein the strength and stiffness necessary to insure the desired accuracy in carrying out the various machining operations for which the machine is intended. The column shown comprises an outer wall 20 in the form of a relatively thin shell produced from flat stock, preferably sheet steel, bent to form three external sides of the column. The fourth side or front of the column is closed preferably by a second sheet 21 of steel bent to provide longitudinal edge flanges 22 disposed substantially parallel to the adjacent free edges 23 of the side forming member 20, each of the flanges 22 being rigidly joined to an adjacent edge 23 through a steel bar 15 to which both are welded, these bars constituting the vertical ways hereinabove mentioned.

Each of the four sides of the column shown are reinforced and stiffened by a series of sheet steel strips 25 bent into V-form and welded along their edges to the side forming members 20 and 21. The strips 25 are arranged side by side about the interior of the column each preferably extending substantially the full length or height thereof. The column shown is further stiffened and internally braced by substantially flat steel strips 26 bridging the several V-shaped strips 25 and welded to the vertices thereof. The several flat strips 26 are preferably arranged and combined to form a substantially continuous inner wall spaced from and parallel to the outer wall 20 of the column and rigidly joined thereto through the strips 25. Those strips 26 within the corners of the column are preferably welded together, as indicated at 27, and in each instance one of those interconnected corner strips 26 is extended and welded, as at 28, to the outer wall 20.

Although the several V-shaped strips 25 might constitute parts of a continuous angularly corrugated sheet, and the several strips 26 might likewise comprise parts of a continuous sheet, both are preferably separately formed and applied to facilitate welding. In this connection it will be noted that in first applying the several strips 25 one at a time to the outer wall 20 the edges of these strips are exposed and thus readily accessible and easily visible so that the operator has no difficulty in making good sound welds, and in subsequently applying the several strips 26 to the strips 25 the joints therebetween are also readily accessible and clearly visible to the welder.

The column is subsequently completed by welding the same to the base 11 and by welding a suitable head piece 29 thereto.

It has been found in actual practice that a column fabricated in the manner above described possesses the requisite strength and stiffness to a high degree, and that the weight thereof is advantageously less than that of comparable columns heretofore known.

Various changes may be made in the embodiment of the invention hereinabove specifically described without departing from or sacrificing the advantages of the invention as defined in the appended claims.

I claim:

1. A machine tool having a tool-supporting fabricated column, said column comprising an outer wall of sheet metal, a series of sheet metal strips extending lengthwise of said column and welded to the inner surface of said wall, each of said strips being bent into V-shape to provide laterally spaced side edges and an intermediate vertex, both side edges of each strip being welded to said wall, and separate substantially flat sheet metal strips each having side edges separately welded to the vertices of successive V-shape strips to integrally join the same to form a stiffener for said wall.

2. A machine tool having a tool-supporting fabricated column of substantially rectangular form, said column comprising an outer sheet metal wall and stiffening means for said wall, said stiffening means including a sheet metal structure having corrugations extending lengthwise of said column and welded to the inner face of said wall, and sheet metal bridging successive corrugations and welded thereto and also having portions welded to said outer wall adjacent the corners of said column.

3. A machine tool having a tool-supporting fabricated column of substantially rectangular form, said column comprising an outer wall portion constituting three integrally joined contiguous sides of the column and another outer wall portion constituting a fourth side of the column, said wall portions being formed of sheet metal, said fourth side wall portion having side edges bent outwardly into substantial parallelism with contiguous edges of adjacent side wall portions, a pair of parallel guide bars extending lengthwise of said column, each of said bars being welded to one of said side edges of said fourth side wall portion and to the contiguous edge of an adjacent side wall portion, and a corrugated sheet metal structure welded to the inner surfaces of said wall portions to reinforce and stiffen said column.

References Cited in the file of this patent

UNITED STATES PATENTS

| | | |
|---|---|---|
| 133,262 | Smith | Nov. 19, 1872 |
| 480,127 | O'Rourke | Aug. 2, 1892 |
| 1,492,545 | Einstein | Apr. 29, 1924 |
| 1,761,037 | Gross | June 3, 1930 |
| 1,930,285 | Robinson | Oct. 10, 1933 |
| 2,070,306 | Keller | Feb. 9, 1937 |
| 2,116,020 | Gauvin | May 3, 1938 |
| 2,240,765 | Dryer | May 6, 1941 |
| 2,534,501 | Coleman | Dec. 19, 1950 |
| 2,621,552 | Montanus et al. | Dec. 16, 1952 |

FOREIGN PATENTS

| | | |
|---|---|---|
| 319,585 | Germany | July 2, 1918 |